(12) United States Patent
Iwahashi (10) Patent No.: US 7,934,246 B2
(45) Date of Patent: Apr. 26, 2011

(54) BROADCAST RECEIVER

(75) Inventor: Toshiya Iwahashi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 397 days.

(21) Appl. No.: 11/546,428

(22) Filed: Oct. 12, 2006

(65) Prior Publication Data

US 2007/0089131 A1  Apr. 19, 2007

(30) Foreign Application Priority Data

Oct. 13, 2005  (JP) .................................. 2005-298779

(51) Int. Cl.
*H04N 7/16*  (2011.01)
(52) U.S. Cl. ........................................................ 725/151
(58) Field of Classification Search .......... 725/143–153; 348/464, 558, 706
See application file for complete search history.

(56) References Cited

U.S. PATENT DOCUMENTS

| | | | | |
|---|---|---|---|---|
| 6,166,778 | A * | 12/2000 | Yamamoto et al. ............ | 348/569 |
| 6,177,931 | B1 * | 1/2001 | Alexander et al. ............. | 725/52 |
| 7,043,691 | B1 * | 5/2006 | Kwon et al. .................. | 715/705 |
| 7,051,359 | B2 * | 5/2006 | Kim et al. ..................... | 725/131 |
| 2001/0010097 | A1 * | 7/2001 | Lee ............................... | 725/132 |
| 2005/0005307 | A1 * | 1/2005 | Kim .............................. | 725/131 |
| 2005/0022241 | A1 * | 1/2005 | Griggs .......................... | 725/48 |
| 2005/0134746 | A1 * | 6/2005 | Brandt .......................... | 348/705 |
| 2005/0157215 | A1 * | 7/2005 | Minnick et al. .............. | 348/725 |
| 2006/0159128 | A1 * | 7/2006 | Chen et al. ................... | 370/486 |

FOREIGN PATENT DOCUMENTS

| | | |
|---|---|---|
| JP | 9-261554 A | 10/1997 |
| JP | 2002-16854 A | 1/2002 |
| JP | 2002-218331 A | 8/2002 |
| JP | 2002-354351 A | 12/2002 |
| JP | 2003-18484 A | 1/2003 |
| WO | WO 0040026 A1 * | 7/2000 |
| WO | WO 0049802 A1 * | 8/2000 |

* cited by examiner

*Primary Examiner* — Andrew Y Koenig
*Assistant Examiner* — Alfonso Castro
(74) *Attorney, Agent, or Firm* — Crowell & Moring LLP (57) ABSTRACT

Disclosed is a broadcast receiver that can automatically enable input of a predetermined signal from external device, when there is no broadcast of program that is receivable at the broadcast receiver. The broadcast receiver 100 detects non-broadcasting time zone in which broadcast program is not broadcasted according to broadcast information (EPG data) included in broadcast signal received by antenna 10 or tuner 2. When it is determined that timing in which power was turned on to start the broadcast receiver 100 falls within the detected non-broadcasting time zone, the broadcast receiver 100 is capable to switch so as to enable broadcasting of video content that corresponds to video signal outputted by the external device connected to a group of external device connecting terminals 8 (connecting terminal 8a-8e), such as video replay device or the DVD player, at a display device 20.

4 Claims, 5 Drawing Sheets

BROADCAST RECEIVER

BACKGROUND OF THE INVENTION

1. Field of the Invention

The present invention relates to a broadcast receiver.

2. Description of the Related Art

Conventionally, there has been a broadcast receiver such as television receiver and the like, that receives broadcast signal of a plurality of channels through antenna, and outputs video and audio of a program corresponding to a broadcast signal of a selected channel.

Concerning such broadcast receiver, a broadcast receiver that monitors synchronized signal of the received broadcast signal, determines that broadcasting of the selected channel is over and has turned into a "sandstorm screen" in accordance that the synchronized signal is not detected, and switches program by automatically selecting other channel that meets the preference of a user (For example, refer to Japanese Patent Specification (Laid open) No. 2003-18484, hereinafter referred to as patent document 1.), has been known.

In addition, a broadcast receiver that outputs video and audio that were recorded before hand in a predetermined recording medium, in a case where the broadcasting of the selected channel is over (For example, refer to Japanese Patent Specification (Laid open) No. 2002-218331, hereinafter referred to as patent document 2.), has been known.

Concerning a broadcast receiver, a broadcast receiver that prevents wasteful assumption of electric power, by switching automatically to a power saving mode in a case where broadcasting of the selected channel is not conducted (For example, refer to Japanese Patent Specification (Laid open) No. 2002-16854, hereinafter referred to as patent document 3.), has been known.

Further, concerning a broadcast receiver, a broadcast receiver that suppresses electric power consumption, by switching power supply circuit off in a case where broadcasting of the selected channel is not conducted (For example, refer to Japanese Patent Specification (Laid open) Tokukaihei 9-261554, hereinafter referred to as patent document 4.), has been known.

In addition, concerning a broadcast receiver, a broadcast receiver that is switched to receive a signal (such as video signal and audio signal) from an external apparatus (such as video replay device) connected through a predetermined external device connecting section (such as connecting terminal), in place of the broadcast signal from the antenna, and is capable to control the external apparatus in accordance to such switching (for example, refer to Japanese Patent Specification (Laid open) No. 2002-354351, hereinafter referred to as patent document 5.), has been known.

SUMMARY OF THE INVENTION

However, concerning the aforementioned patent document 1, in a case where broadcasting is over at all the broadcasting channels, and broadcasting of program is not conducted, a problem that there is no channel (program) to be switched to by the broadcast receiver has occurred.

In addition, concerning the aforementioned patent document 2, output of the video and audio that were recorded to the recording medium before hand can be conducted when the broadcasting is over, however, there was a problem that the outputted video and audio do not meet the preference of the user, or do not meet the mood of the user at that time.

Concerning the aforementioned patent documents 3 and 4, wasteful assumption of electric power can be prevented or suppressed in a case where broadcasting of a program is not conducted. However, it was not able to switch to a broadcasting of a video that meet the preference of the user or the like.

Therefore, concerning the techniques of the aforementioned patent documents 1 through 4, in a case where broadcasting of program is not conducted, the user had to conduct a predetermined input switching operation in order to switch to signal input from an external device connected to an external device connecting section of the broadcast receiver, to make the broadcast receiver output a video that meet the preference of the user or the like.

In addition, concerning the aforementioned patent document 5, it is capable to enable controlling regarding the external device, when it is switched to signal input from the external device connected to the external device connecting section of the broadcast receiver. However, it was not capable to enable automatic switching so that signal from the external device connected to the external device connecting section is inputted, so as to switch to broadcasting of a video that meet the preference of the user or the like, in a case where there is no program that can be received at the broadcast receiver.

An object of the present invention is to provide a broadcast receiver that is capable to enable predetermined signal input from the external device, automatically in case where there is no program that can be received at the broadcast receiver.

In order to solve the aforementioned problems, according to a first aspect reflecting the present invention, a broadcast receiver comprises: a receiving unit to receive a broadcast signal that includes broadcast information relating to a predetermined broadcast program through an antenna; an external device connecting section that includes a plurality of connecting units, to which a plurality of external devices that output a video signal relating to a predetermined video content, are connected; a program outputting unit to broadcast the broadcast program that corresponds to the broadcast signal received by the receiving unit, or the video content that corresponds to the video signal outputted by the external devices connected to the external device connecting section; an external input selection section to select a first connecting unit, to which a first external device that outputs a first video signal relating to a first video content broadcasted at the program outputting unit is connected, among the plurality of the connecting units; a non-broadcasting time zone detecting section to detect a non-broadcasting time zone in which the broadcast program is not broadcasted, according to the broadcast information included in the broadcast signal received by the receiving unit; a switching time zone setting section to set a switching time zone to switch so as to enable broadcasting of the video content that corresponds to the video signal outputted by the external devices at the program outputting unit; a timing determination section to determine whether a timing in which power of the broadcast receiver was turned on falls within the non-broadcasting time zone detected by the non-broadcasting time zone detecting section or the switching time zone set by the switching time zone setting section; and an input signal switching section to switch so as to enable broadcasting of the video content that corresponds to the video signal outputted by the external devices at the program outputting unit, in a case where it is determined that the timing in which power of the broadcast receiver was turned on falls within the non-broadcasting time zone or the switching time zone, by the timing determination section.

The broadcast receiver can detect the non-broadcasting time zone in which broadcast program is not broadcasted, according to the broadcast information included in the broadcast signal received by the receiving unit. In a case where it is determined that the timing in which the power was turned on to start the broadcast receiver falls within the detected non-broadcasting time zone, the broadcast receiver can switch so as to enable broadcasting of video content that corresponds to the video signal outputted by the external device connected to the external device connecting section at the program outputting unit. That is, in a case where the power of the broadcast receiver is turned on during the non-broadcasting time zone in which there is no broadcast signal receivable by the broadcast receiver, it is capable to enable broadcasting of the video content that corresponds to the video signal by automatically switching to input of video signal from the external device. Therefore, a predetermined input switching operation to switch to the video signal input from the external device connected to the external device connecting section at the broadcast receiver can be omitted.

Therefore, in a case where there is no broadcast signal that is receivable at the broadcast receiver, an operation of input switching, to switch to video signal input from the external device connected to the external device connecting section at the broadcast receiver is not needed. Here, the operation of input switching is conducted so that the user can watch video and the like that is broadcasted by the broadcast receiver, by receiving video signal from the external device, and enabling broadcasting of video content that corresponds to video signal at the program outputting unit of the broadcast receiver. Therefore, operability of the broadcast receiver can be improved. Particularly, in a case where the user is aware that there is no broadcast signal that is receivable by the broadcast receiver at present, and the user turns on the power of the broadcast receiver to watch video content that corresponds to video signal from the external device, the automatic switching operation so as to enable input of video signal from the external device is a preferable operation to the user.

In addition, the broadcast receiver can set a switching time zone to switch so as to enable broadcasting of the video content that corresponds to video signal outputted from the external device, at the program outputting unit. Then, in a case where it is determined that the time when the power was turned on to start the broadcast receiver falls within the switching time zone that is set, the broadcast receiver can switch so as to enable broadcasting of the video content that corresponds to the video signal outputted by the external device connected to the external device connecting section, at the program outputting unit. That is, a switching time zone can be set at the broadcast receiver, in order to broadcast the video content that corresponds to the video signal by operating the external device, and not to broadcast the broadcast program that corresponds to the broadcast signal received by the receiving unit.

Therefore, in the switching time zone, it is automatically switched so as to enable input of the video signal from the external device at the broadcast receiver. Thus, a predetermined operation of input switching, to broadcast the video content that corresponds to video signal by switching to input of the video signal from the external device in place of the broadcast signal received through the receiving unit, can be omitted.

In addition, the broadcast receiver can select a first connecting unit, to which the first external device that outputs the first video signal relating to the fist video content broadcasted at the program outputting unit is connected, among a plurality of connecting units to connect a plurality of external devices. Therefore, when the broadcast receiver switched to input of the video signal from the external device automatically within the non-broadcasting time zone or the switching time zone, input of the desired video signal from the desired external device through the selected connecting unit can be enabled.

Thus, the broadcast receiver is capable to broadcast the video content desired by the user at the program outputting unit, and the user can watch the desired video content.

According to a second aspect reflecting the present invention, a broadcast receiver comprises: a receiving unit to receive a broadcast signal that includes broadcast information relating to a predetermined broadcast program through an antenna; an external device connecting section, to which an external device that outputs a video signal relating to a predetermined video content is connected; a program outputting unit to broadcast the broadcast program that corresponds to the broadcast signal received by the receiving unit, or the video content that corresponds to the video signal outputted by the external device connected to the external device connecting section; a non-broadcasting time zone detecting section to detect a non-broadcasting time zone in which the broadcast program is not broadcasted, according to the broadcast information included in the broadcast signal received by the receiving unit; a timing determination section to determine whether a timing in which power of the broadcast receiver was turned on falls within the non-broadcasting time zone detected by the non-broadcasting time zone detecting section; and an input signal switching section to switch so as to enable broadcasting of the video content that corresponds to the video signal outputted by the external device at the program outputting unit, in a case where it is determined that the timing in which power of the broadcast receiver was turned on falls within the non-broadcasting time zone, by the timing determination section.

The broadcast receiver can detect the non-broadcasting time zone in which broadcast program is not broadcasted, according to the broadcast information included in the broadcast signal received by the receiving unit. Then, in a case where it is determined that the timing in which power was turned on to start the broadcast receiver falls within the detected non-broadcasting time zone, the broadcast receiver can switch so as to enable broadcasting of the video content that corresponds to the video signal outputted by the external device connected to the external device connecting section, at the program outputting unit.

That is, concerning the non-broadcasting time zone in which there is no broadcast signal that is receivable by the broadcast receiver, when the power of the broadcast receiver is turned on, broadcasting of the video content that corresponds to the video signal can be enabled by automatically switching to input of video signal from the external device. Therefore, a predetermined operation of input switching, to switch to input of video signal from the external device connected to the external device connecting section at the broadcast receiver, can be omitted.

Therefore, in a case where there is no broadcast signal that is receivable at the broadcast receiver, an operation of input switching, to switch to input of video signal from the external device connected to the external device connecting section at the broadcast receiver is not needed. Here, the operation of input switching is conducted so that the user can watch video and the like that is broadcasted by the broadcast receiver, by receiving video signal from the external device, and enabling broadcasting of video content that corresponds to video signal at the program outputting unit of the broadcast receiver. Therefore, operability of the broadcast receiver can be improved. Particularly, in a case where the user is aware that there is no broadcast signal that is receivable by the broadcast receiver at present, and the user turns on the power of the broadcast receiver to watch video content that corresponds to video signal from the external device, the automatic switching operation so as to enable input of video signal from the external device is a preferable operation to the user.

Further, according to the second aspect of the present invention, the external device connecting section includes a plurality of connecting units to connect a plurality of external devices; and the broadcast receiver further comprises an external input selection section to select a first connecting unit to which a first external device that outputs a first video signal relating to a first video content broadcasted at the program outputting unit, among the plurality of the connecting units.

The broadcast receiver can select the first connecting unit, to which the first external device that outputs the first video signal relating to the first video content broadcasted at the program outputting unit is connected, among a plurality of connecting units to connect a plurality of external devices. Therefore, when the broadcast receiver switched to input of the video signal from the external device automatically within the non-broadcasting time zone or the like, input of the desired video signal from the desired external device through the selected connecting unit can be enabled. Thus, the broadcast receiver is capable to broadcast the video content desired by the user at the program outputting unit, and the user can watch the desired video content.

Further, according to the second aspect of the present invention, the broadcast receiver further comprises: a switching time zone setting section to set a switching time zone to switch so as to enable broadcasting of the video content that corresponds to the video signal outputted by the external device at the program outputting unit; and a switching time zone determination section to determine whether a time in which power of the broadcast receiver was turned on falls within the switching time zone set by the switching time zone setting section; wherein the input signal switching section switches so as to enable broadcasting of the video content that corresponds to the video signal outputted by the external device at the program outputting unit, in a case where it is determined that the time in which power of the broadcast receiver was turned on falls within the switching time zone, by the switching time zone determination section.

The broadcast receiver can set a switching time zone to switch so as to enable broadcasting of the video content that corresponds to video signal outputted from the external device at the program outputting unit. Then, in a case where it is determined that the time when the power was turned on to start the broadcast receiver falls within the switching time zone that is set, the broadcast receiver can switch so as to enable broadcasting of the video content that corresponds to the video signal outputted by the external device connected to the external device connecting section.

That is, a switching time zone can be set at the broadcast receiver, in order to broadcast the video content that corresponds to the video signal by operating the external device, and not to broadcast the broadcast program that corresponds to the broadcast signal received by the receiving unit.

Therefore, in the switching time zone, it is automatically switched so as to enable input of the video signal from the external device at the broadcast receiver. Thus, a predetermined operation of input switching, to broadcast the video content that corresponds to video signal by switching to input of the video signal from the external device in place of the broadcast signal received through the receiving unit, can be omitted.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

DETAILED DESCRIPTION OF THE PREFERRED EMBODIMENT

Hereinafter, an embodiment of a broadcast receiver according to the present invention will be described with reference to figures. In the present embodiment, television broadcast receiver (hereinafter referred to as broadcast receiver) will be taken as an example of the broadcast receiver for description.

Figure 1:
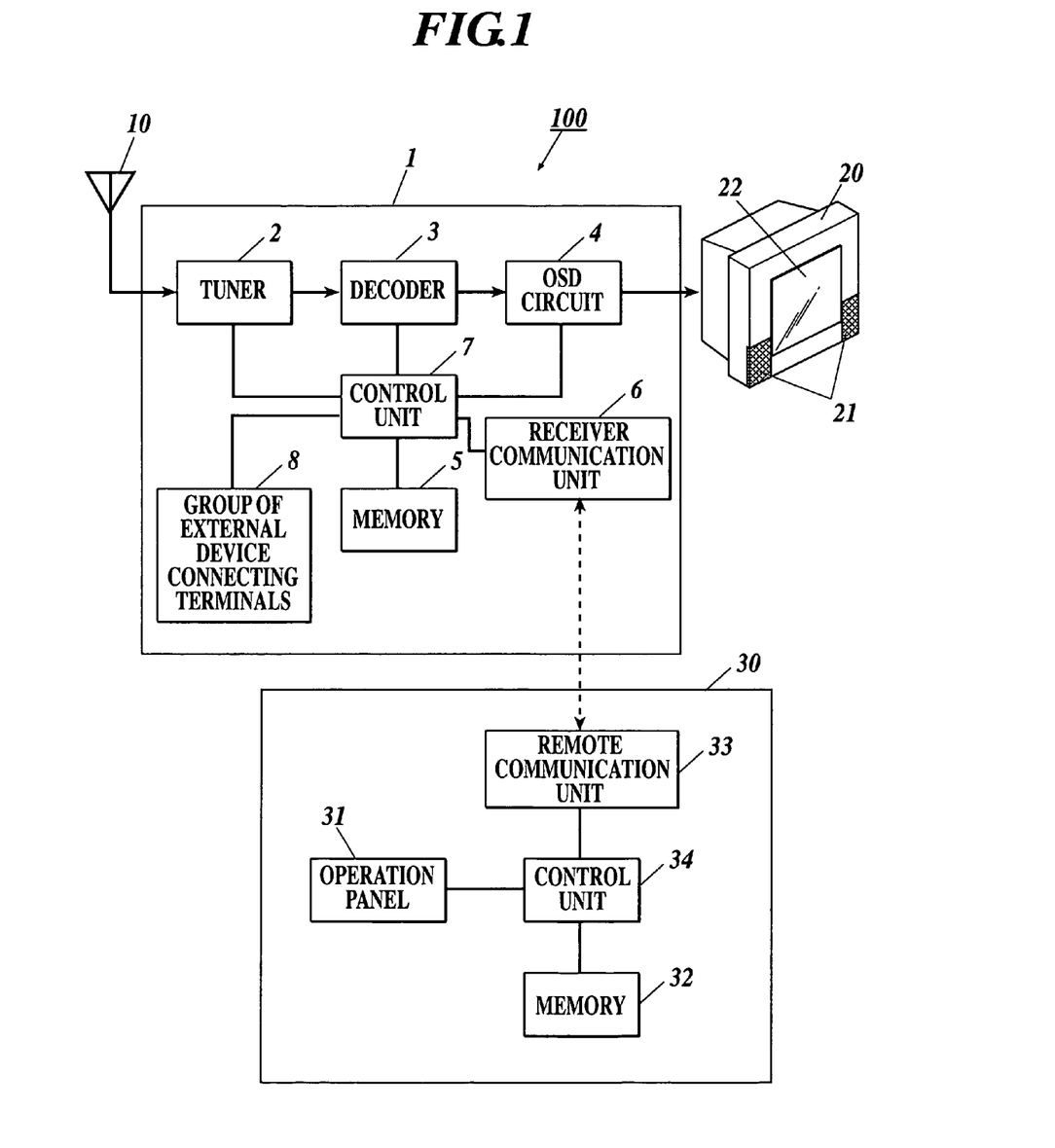
FIG. 1 is a block diagram that shows a principal structure of a broadcast receiver and a remote according to the present invention.

As shown in FIG. 1, broadcast receiver 100 is provided with a receiver main body 1 to receive broadcast signal, a display device 20 as a program outputting unit that outputs video and audio corresponding to the broadcast signal received at the receiver main body 1, thus displaying a broadcast program (program for broadcasting), a remote 30 to select a channel that corresponds to a broadcast program in accordance with the broadcast signal received by the receiver main body 1 and then switch programs, and the like.

As shown in FIG. 1, the receiver main body 1 is provided with a tuner 2 as a receiving unit to receive a digital broadcast signal that exists in a frequency band corresponding to a desired channel through an antenna 10, a decoder 3 to decode the digital broadcast signal received by the tuner 2, an OSD circuit 4 to display a predetermined On-Screen Display (hereinafter referred to as OSD) on the display device 20, a memory 5 to store transmission frequency of each channel of digital broadcast and channel composition information, a communication unit 6 to communicate with the remote 30, a group of external device connecting terminals 8 as an external device connecting section to which a predetermined external device is connected to, and a control unit 7 comprising a CPU to control each unit of the broadcast receiver 100 and the like. Here, a group of operation buttons that enables input operation similar to the remote 30 may be provided to the receiver main body 1.

The antenna 10 receives a digital signal of high frequency (RF) that is encoded, transmitted from a television broadcasting station.

The tuner 2 receives supply of digital broadcast signal received by the antenna 10, as well as conducts processing of station selection according to an instruction relating to channel selection inputted from the remote 30 or the like by the user. Subsequently, the tuner 2 receives a digital broadcast signal that exists in a frequency band corresponding to the selected channel, modulates the broadcast signal into an intermediate frequency (IF), and outputs to the decoder 3.

That is, the tuner 2 conducts processing of station selection, in which broadcast program is switched by selecting a broadcast signal that corresponds to a channel inputted from the remote 30 or the like, among a plurality of broadcast signals relating to broadcasting of a plurality of channels that are receivable.

The decoder 3 decodes the digital broadcast signal received by the tuner 2. In addition, the decoder 3 obtains a broadcast information (EPG data, described later) included in the broadcast signal, and sends the obtained broadcast information to the control unit 7.

The OSD circuit 4 outputs the broadcast signal decoded by the decoder 3 to the display device 20, according to the instruction from the control unit 7. In addition, according to the instruction from the control unit 7, the OSD circuit 4 displays a predetermined list (OSD display) relating to channel information or the like that is receivable, and outputs OSD display signal to make the display device 20 display a display such as a menu display and a setting display, to conduct input and operation of various kinds of settings or the like at the broadcast receiver 100 (receiver main body 1).

The memory 5 stores information relating to frequency band of each channel and channel composition information, as well as stores information relating to OSD display when the broadcast receiver 100 is shipped from the manufacturing site.

The communication unit 6 conducts sending and receiving of various kinds of data between the receiver main body 1 and the remote 30, by conducting sending and receiving of a predetermined signal with the remote 30.

For example, the communication unit 6 receives a channel selection signal to switch broadcast program (program to broadcast), a connection terminal selection signal to select connection terminal that is connected with a desired external device among a plurality of connection terminals (group of external device connecting terminals 8) described later, a setting signal relating to switching time zone data that is set and inputted through an operation panel 31 described later, and the like, that are sent from the remote 30. Subsequently, the communication unit 6 sends those various kinds of signals received to the control unit 7.

Figure 2A:
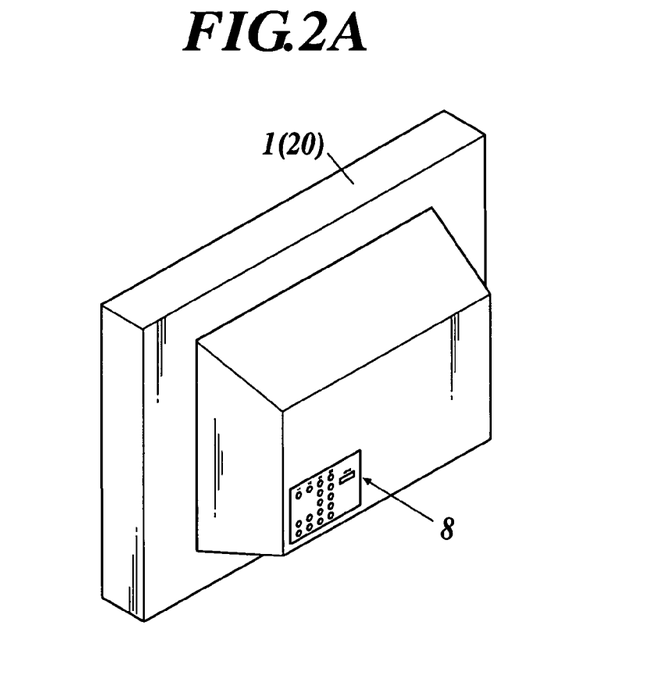
FIG. 2A is a perspective view showing a group of external device connecting terminals.
Figure 2B:
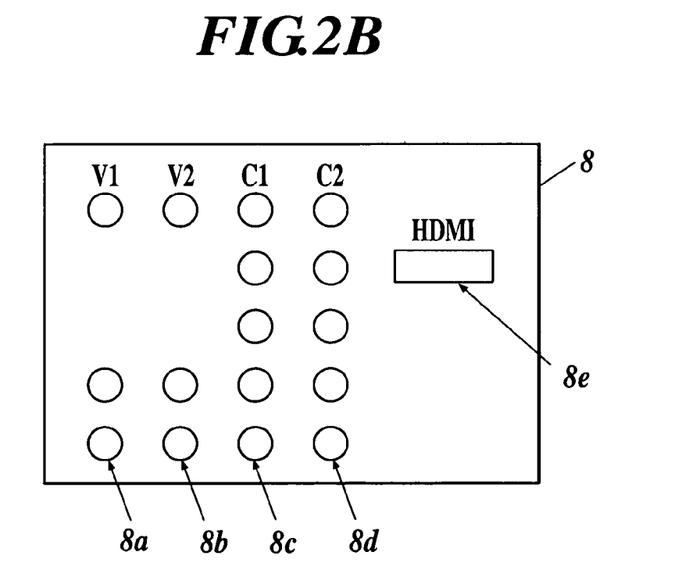
FIG. 2B is an enlarged view showing the group of external device connecting terminals.

As shown in FIG. 2A and FIG. 2B, the group of external connecting terminals 8 is provided at the back side of the receiver main body 1 (display device 20), and includes a plurality of connecting terminals (8a-8e) as a connecting unit, such as a connecting terminal for VIDEO-1 8a, a connecting terminal for VIDEO-2 8b, a connecting terminal for COMPONENT-1 8c, a connecting terminal for COMPONENT-2 8d, a connecting terminal for HDMI 8e, and the like.

Here, the connecting terminal for VIDEO-1 8a and the connecting terminal for VIDEO-2 8b are structured with one composite video terminal and two audio terminals. In addition, the connecting terminal for COMPONENT-1 8c and the connecting terminal for COMPONENT-2 8d are structured with a component video terminal comprising three terminals, and two audio terminals. Further, the connecting terminal for HDMI 8e is a terminal that can conduct communication of both video signal and audio signal with one cable.

To each of these connecting terminals, external device such as video replay device, DVD, and the like, are each connected through a predetermined connecting cable. Then, a video signal relating to a predetermined video content outputted by the external device is outputted to the display device 20 through the connecting terminal.

As shown in FIG. 1, the display device 20 includes an audio outputting unit 21 to output audio corresponding to audio data in accordance with broadcast signal received by the receiver main body 1, or the audio data in accordance with the video signal outputted by the external device, and a video displaying unit 22 to display video corresponding to video data in accordance with the broadcast signal and the video signal.

The audio outputting unit 21 is, for example, a speaker device, and outputs audio corresponding to audio data in accordance with broadcast signal received by the receiver main body 1 or the video signal outputted by the external device.

The video displaying unit 22 is, for example, a liquid crystal display device, and displays image and video corresponding to video data in accordance with broadcast signal received by the receiver main body 1 or the video signal outputted by the external device.

The remote 30 is a device to input operation instruction by the user to the receiver main body 1, and is structured so as to be capable to instruct operation of the receiver main body 1 and the display device 20, by using infrared ray or the like.

As shown in FIG. 1, the remote 30 is provided with an operation panel 31 that is arranged with various kinds of operation keys and the like, a memory 32 to store channel data relating to digital broadcasting, and a control unit 34 comprising a CPU or the like to control each part of the remote 30.

Figure 3:
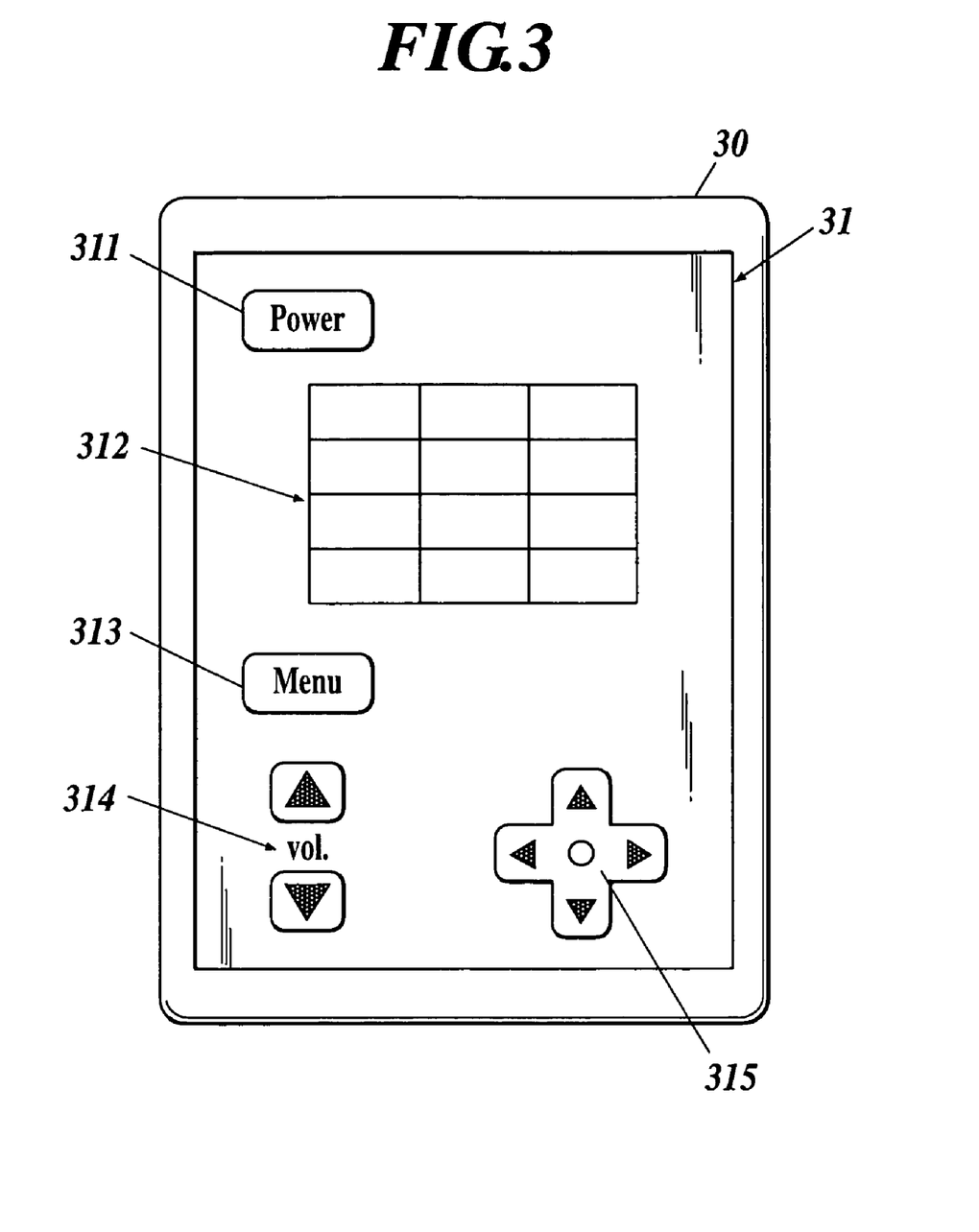
FIG. 3 is a plane view showing a remote of the broadcast receiver.

As shown in FIG. 3, the operation panel 31 is provided with a power key 311 to turn on and turn off the power of the receiver main body 1 and the display device 20, a channel key 312 to select channel of the broadcast receiver 100, a menu key 313 to callout a menu display of the receiver main body 1 and the display device 20, a volume up/down key 314 to adjust audio volume of the broadcast receiver 100 (display device 20), an up/down/left/right key 315 to conduct various kinds of operation, and the like.

The memory 32 of the remote 30 stores channel data relating to digital broadcasting. Here, the channel data is a data to select a desired channel among a plurality of channels that are receivable by the receiver main body 1 (broadcast receiver 100), and is a data in which a channel number and information relating to frequency band of each channel are related.

The communication unit 33 of the remote 30 conducts sending and receiving of various kinds of data between the remote 30 and the receiver main body 1, by conducting sending and receiving of a predetermined signal with the receiver main body 1. For example, the communication unit 33 sends to the receiver main body 1, a channel selection signal to switch channel (broadcast program) in accordance with operation of the channel key 312, and a connecting terminal selection signal to switch to a video signal input from the external device in accordance with operation of the predetermined key.

The control unit 34 of the remote 30 conducts control of each part of the remote 30. Specifically, the control unit 34 executes control to send various kinds of signals in accordance with operation of the operation panel 31, to the receiver main body 1 through the communication unit 33.

Then, the control unit 7 of the receiver main body 1 (broadcast receiver 100) receives an input operation or the like from the user using remote 30 or the like, and controls each unit of the broadcast receiver 100 through Data-Bus.

The control unit 7, according to the operation instruction to select channel, from the user by the remote 30 or the like, makes the tuner 2 receive broadcast signal that corresponds to the channel, makes the decoder 3 decode the broadcast signal as well as outputs it to the display device 20 through ODS circuit 4, and conducts control to broadcast the broadcast program that corresponds to the received broadcast signal. That is, the control unit 7 executes control so as to switch channel (broadcast program) in accordance with input of channel selection signal to switch channel (broadcast program) that is sent from the remote 30, and to output a broadcast program corresponding to the broadcast signal that corresponds to the selected channel.

In addition, the control unit 7 executes control so as to switch between output of a broadcast program that corresponds to a broadcast signal received through the antenna 10 or the tuner 2 at the display device 20, and output of video content that corresponds to a video signal outputted by the external device connected to the group of external device connecting terminals 8 (a plurality of connecting terminals (8a-8e)) at the display device 20.

Further, the control unit 7 serves as a non-broadcasting time zone detecting section to detect a non-broadcasting time zone, in which there is no broadcast program that is broadcasted, according to EPG (Electronic Program Guide) data which is a broadcast information included in the digital broadcast signal received through the antenna 10 or the tuner 2.

For example, the control unit 7 as the non-broadcasting time zone detecting section obtains EPG data included in the received digital broadcast signal, and detects a broadcasting time zone in which each broadcasting station transmits broadcast signal, and a non-broadcasting time zone in which no broadcasting station transmits broadcast signal, according to the EPG data.

Specifically, according to the obtained EPG data, in a case where the control unit 7 detects that broadcasting time zone of broadcasting station A is from 6:00 AM to 0:00 AM, broadcasting time zone of broadcasting station B is from 5:00 AM to 11:00 PM, and broadcasting time zone of broadcasting station C is from 7:00 AM to 1:00 AM of the next day, the control unit 7 as the non-broadcasting time zone detecting section detects that the non-broadcasting time zone is from 1:00 AM to 5:00 AM.

Here, data relating to the detected non-broadcasting time zone is stored in memory 5. The data relating to the non-broadcasting time zone is overwritten at the memory 5, thus the latest data of non-broadcasting time zone is always stored.

The control unit 7 as the non-broadcasting time zone detecting section may detect the non-broadcasting time zone when the power of the receiver main body 1 is turned on, and store the non-broadcasting time zone data in the memory 5. In addition, it may also detect non-broadcasting time zone at a predetermined time that is set before hand (for example, at noon (0:00 PM)), and store the non-broadcasting time zone data in the memory 5.

In addition, the control unit 7 serves as a timing determination section to determine whether the timing when the power of the broadcast receiver 100 (receiver main body 1) was turned on, falls within the non-broadcasting time zone detected by the control unit 7 as the non-broadcasting time zone detecting section or not.

Here, the control unit 7 includes a clock function that times the present time, and is capable to recognize the time of timing when the power was turned on, and can determine whether the time of timing falls within the non-broadcasting time zone or not.

In a case where it is determined that the timing when the power of the broadcasting receiver 100 (receiver main body 1) was turned on falls within the non-broadcasting time zone according to the control unit 7 as the timing determination section, the control unit 7 serves as an input signal switching section to switch to enable broadcasting of video content corresponding to video signal outputted by the external device, at the display device 20.

That is, in a case where the timing when the power of the broadcast receiver 100 (receiver main body 1) was turned on falls within the non-broadcasting time zone, the control unit 7 as the input signal switching section conducts control to switch from outputting broadcast program that corresponds to broadcast signal received through the antenna 10 or the tuner 2 at the display device 20, to outputting video content that corresponds to video signal outputted by the external device that is connected to the group of external device connecting terminals 8 (plurality of connecting terminals (8a-8e)) at the display device 20.

In addition, the control unit 7 serves as a part of an external input selection section to select a connecting terminal, to which an external device that outputs video signal relating to video content to be broadcasted at the display device 20 is connected, among the plurality of connecting terminals (connecting terminal for VIDEO-18a, connecting terminal for VIDEO-28b, connecting terminal for COMPONENT-18c, connecting terminal for COMPONENT-28d, connecting terminal for HDMI 8e).

Specifically, according to an operation to select one connecting terminal among the plurality of connecting terminals (8a-8e) inputted through the operation panel 31 of the remote 30 or the like, the control unit 7 as the external input selection section executes a control to select a connecting terminal, to which an external device that outputs video signal relating to video content to be broadcasted at the display device 20 is connected. Here, selection data relating to the connecting terminal selected by the control unit 7 as the external input selection section is stored in the memory 5.

Subsequently, when it is switched so as to enable outputting of video content that corresponds to video signal outputted by the external device, by the control unit 7 as the input signal switching section, video content that corresponds to video signal outputted by the external device which is connected to the connecting terminal, selected by the control unit 7 as the external input selection section, is displayed at the display device 20.

Figure 4:
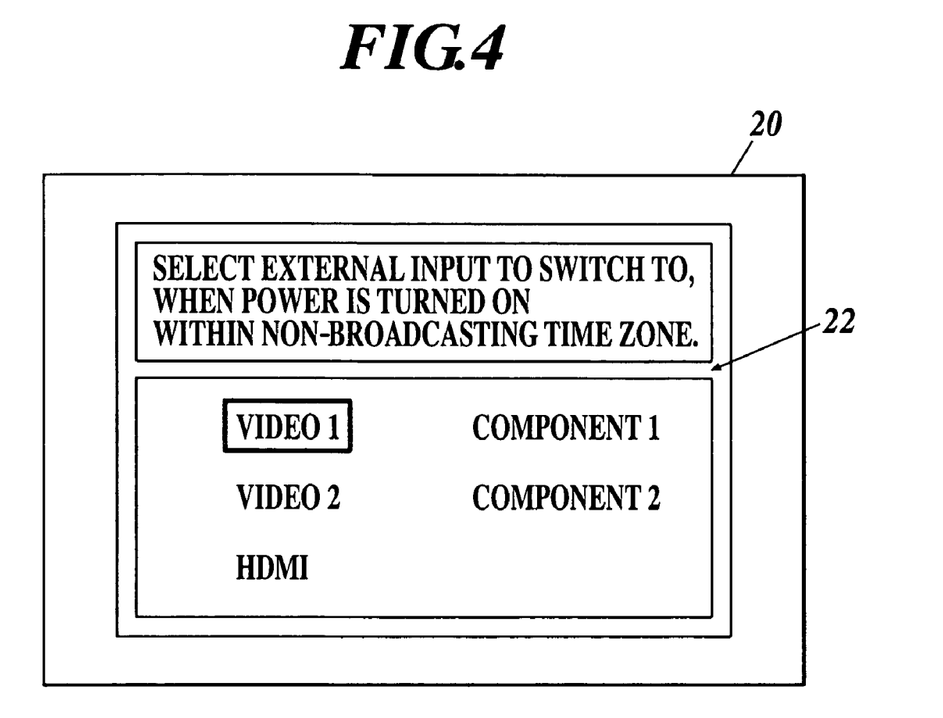
FIG. 4 is an explanatory drawing showing an example of an OSD display to select a connecting terminal.

For example, when the control unit 7 detects an operation signal that corresponds to depression of the menu key 313 of the remote 30 which serves as a part of the external input selection section, the OSD display to select one connecting terminal among the plurality of connecting terminals (8a-8e), as shown in FIG. 4, is displayed in the video display unit 22 of the display device 20.

Subsequently, cursor is moved by operating up/down/left/right key 315 of the remote 30, and one among "VIDEO-1", "VIDEO-2", "COMPONENT-1", "COMPONENT-2", and "HDMI", displayed on the video display unit 22, is instructed. Here, in FIG. 4, a state in which "VIDEO-1" is instructed is shown. By "VIDEO-1" being instructed at the OSD display on the video display unit 22, it is recognized that connecting terminal for VIDEO-1 8a among the group of external connecting terminals 8 is selected. Thus, when it is switched so as to enable supplying of video content that corresponds to video signal outputted by the external device, by the control unit 7 as the input signal switching section, video content that corresponds to video signal outputted by the external device which is connected to the connecting terminal for VIDEO-1 8a is displayed at the display device 20.

In addition, the control unit 7 serves as a part of a switching time zone setting section to set a switching time zone when it is switched so as to enable broadcasting of video content that corresponds to video signal outputted by the external device at the display device 20, according to the data relating to time zone inputted through the operation panel 31 of the remote 30 that serves as a part of the switching time zone setting section.

For example, in a case where the user does not watch broadcast program of television that corresponds to broadcast signal from 0:00 AM to 6:00 AM, and it is determined to operate an external device to watch video content that corresponds to the video signal in an occasion where the power of the broadcast receiver 100 (receiver main body 1) was turned on within that time, the switching time zone is set from 0:00 AM to 6:00 AM.

In addition, the control unit 7 serves as a switching time zone determination section to determine whether the time at which the power of the broadcast receiver 100 (receiver main body 1) was turned on falls within the switching time zone set by the control unit 7 as the switching time zone setting section or not. Here, the control unit 7 has a clock function to time the present time, recognize the time when the power was turned on, and determine whether the time falls within the switching time zone or not.

Here, the control as the switching time zone determination section may be executed by the control unit 7 as timing determination section.

In addition, in a case where it is determined that the time when the broadcast receiver 100 (receiver main body 1) was turned on falls within the switching time zone by the control unit 7 as the switching time zone determination section, the control unit 7 serves as an input signal switching section to switch so as to enable broadcasting of video content that corresponds to video signal outputted by the external device at the display device 20.

That is, in a case where the time when the power of the broadcast receiver 100 (receiver main body 1) was turned on falls within the switching time zone, the control unit 7 as the input signal switching section conducts control to switch from outputting broadcast program that corresponds to broadcast signal received through the antenna 10 or the tuner 2 at the display device 20, to outputting video content that corresponds to video signal outputted by the external device that is connected to the group of external device connecting terminals 8 (plurality of connecting terminals (8a-8e)) at the display device 20.

Here, the processing so that the broadcast receiver 100 switch from outputting broadcast program that corresponds to broadcast signal at the display device 20, to outputting video content that corresponds to video signal at the display device 20, is not limited to automatic switching in a case where it is determined that the timing when the power of the broadcast receiver 100 (receiver main body 1) was turned on falls within the non-broadcasting time zone or the switching time zone, according to the control processing of the present invention.

For example, by operating a predetermined key provided to the remote 30 or the like, the user can switch from outputting broadcast program that corresponds to broadcast signal at the display device 20, to outputting video content that corresponds to video signal at the display device 20, at an arbitrary desired timing. Here, by operating a predetermined key provided to the remote 30 or the like, the user can cause a video content that corresponds to video signal outputted by an arbitrary external device among the plurality of external devices connected to the group of external device connecting terminals 8 (plurality of connecting terminals (8a-8b)), to be output to the display device 20.

Figure 5:
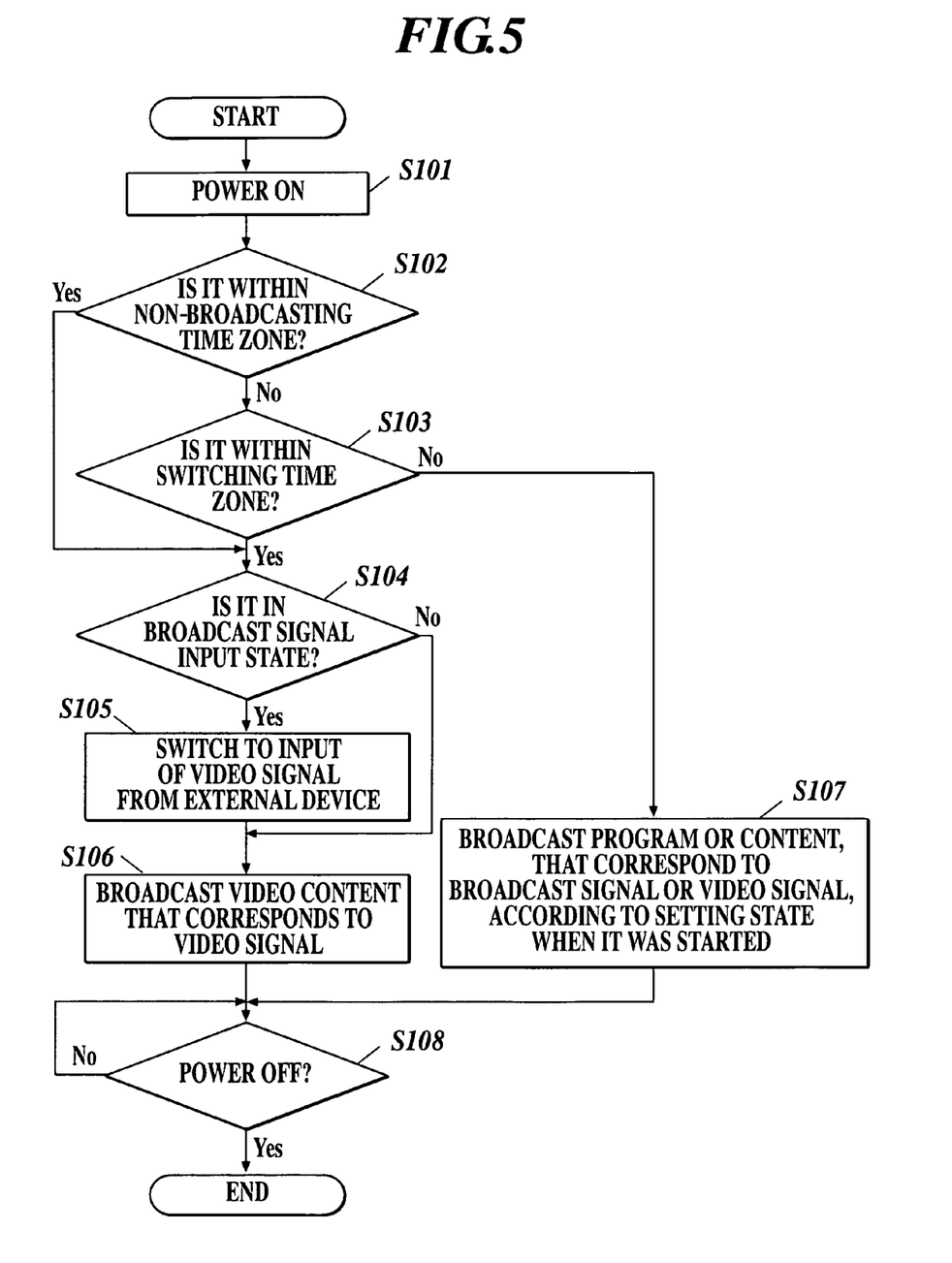
FIG. 5 is a flowchart showing a processing in which the broadcast receiver switches so that a display device is capable to output video content corresponding to a video signal outputted by an external device connected to the group of external device connecting terminals.

Next, a processing of the broadcast receiver 100 according to the present invention to switch so as to enable outputting of video content that corresponds to video signal outputted by the external device connected to the group of external device connecting terminals 8 at the display device 20, is described with reference to a flow chart shown in FIG. 5.

First of all, in accordance to the power key 311 of the remote 30 being depressed, power of the broadcast receiver 100 is switched to an ON state, and the broadcast receiver 100 is started (step S101).

Next, the control unit 7 determines whether the timing when the power of the broadcast receiver 100 was turned on falls within the non-broadcasting time zone or not (step S102).

When the control unit 7 determines that the timing when the power of the broadcast receiver 100 was turned on falls within the non-broadcasting time zone (step S102; Yes), it moves on to step S104.

Meantime, when the control unit 7 determines that the timing when the power of the broadcast receiver 100 was turned on does not fall within the non-broadcasting time zone (step S102; No), the control unit 7 determines whether the time when the power of the broadcast receiver 100 was turned on falls within the switching time zone or not (step S103).

When the control unit 7 determines that the time when the power of the broadcast receiver 100 was turned on does not fall within the switching time zone (step S103; No), it moves on to step S107.

Meantime, when the control unit 7 determines that the time when the power of the broadcast receiver 100 was turned on falls within the switching time zone (step S103; Yes), it moves on to step S104.

In step S104, the control unit 7 determines whether the broadcast receiver 100 is in an input state for broadcast signal received through the antenna 10 or the tuner 2; or is in an input state for video signal from an external device connected to the group of external device connecting terminals 8 (plurality of connecting terminals (8a-8e)) (step S104).

When the control unit 7 determines that the broadcast receiver 100 is not in the input state for broadcast signal received through the antenna 10 or the tuner 2, and is in the input state for video signal from an external device connected to the group of external device connecting terminals 8 (step S104; No), it moves on to step S106.

Meantime, when the control unit 7 determines that the broadcast receiver 100 is in the input state for broadcast signal received through the antenna 10 or the tuner 2, and is not in the input state for video signal from an external device connected to the group of external device connecting terminals 8 (step S104; Yes), the control unit 7 switches the settings of the broadcast receiver 100 so as to enable input of video signal from the external device, thus switches to a state capable to broadcast video content that corresponds to video signal outputted by the external device at the display device 20 (step S105).

Subsequently, in step S106, since the broadcast receiver 100 is capable to broadcast video content that corresponds to the video signal outputted by the external device, by starting and operating the external device, video content that corresponds to the video signal can be broadcasted at the display device 20 (step S106).

In addition, in step S107, the broadcast receiver 100 broadcasts a predetermined video (broadcast program, video content) that correspond to the broadcast signal or the video signal at the display device 20, in accordance with the setting state to receive input of the broadcast signal or the setting state to receive input of the video signal, that were set when the broadcast receiver 100 was started (step S107).

Subsequently, when the control unit 7 determines that the power of the broadcast receiver 100 is switched to OFF state in accordance with the power key 311 of the remote 30 being depressed (step S108; Yes), the control unit 7 terminates the broadcast receiver 100, and ends the entire processing.

As described, the broadcast receiver 100 according to the present invention can detect the non-broadcasting time zone, in which each broadcasting station does not transmit broadcast signal, according to the EPG data included in the broadcast signal. Therefore, in a case where there is no broadcast of program that is receivable by the broadcast receiver 100 such as the non-broadcasting time zone, input of the predetermined video signal from the external device such as video replay device or the DVD player can be automatically enabled. Thus, a predetermined input switching operation, to switch to input of video signal from the external device connected to the group of external device connecting terminals 8 at the broadcast receiver 100, can be omitted.

That is, in a case where there is no broadcast of program that is receivable by the broadcast receiver 100, in order to watch video broadcasted by the broadcast receiver 100, the user does not need to conduct operation to switch input so as to switch to input of video signal from the external device so that the broadcast receiver 100 (display device 20) is enabled to broadcast video content that corresponds to video signal outputted from the external device. Therefore, operability of the broadcast receiver 100 can be improved. Particularly, in a case where the user is aware that there is no broadcast of program that is receivable by the broadcast receiver 100 at present, and the user turns on the power of the broadcast receiver 100 to watch video content that corresponds to video signal from the external device, the automatic switching operation so as to enable input of video signal from the external device is a preferable operation to the user.

In addition, in a case where the user is not aware that there is no broadcast of program that is receivable by the broadcast receiver 100, and the user turns on the power of the broadcast receiver 100, the user can recognize that there is no broadcast of program that is receivable by the broadcast receiver 100 at present, by being automatically switched so as to enable input of video signal from the external device.

In addition, the broadcast receiver 100 can set a switching time zone, so as not to watch broadcast program that corresponds to the broadcast signal received through the antenna 10 or the tuner 2, but to watch video content that corresponds to video signal by operating the external device. When it is within such switching time zone, it is automatically switched to enable input of predetermined video signal from the external device. Therefore, a predetermined input switching operation to switch from receiving broadcast signal through the antenna 10 or the tuner 2, to the input of video signal from the external device, can be omitted.

Here, application of the present invention is not limited to the afore-mentioned embodiments, and are arbitrarily modified as far as it does not deviate the scope of the present invention.

The entire disclosure of Japanese Patent Application No. Tokugan 2005-298779 filed on Oct. 13, 2005 including specification, claims, drawings and summary are incorporated herein by reference in its entirety.

What is claimed is:

1. A broadcast receiver comprising:
a memory;
a receiving unit to receive a plurality of broadcast signals that includes broadcast guide information relating to a predetermined broadcast program through an antenna;
an external device connecting section that includes a plurality of connecting units, to which a plurality of external devices that output a video signal relating to a predetermined video content, are connected;
a program outputting unit that supplies a broadcast program that corresponds to one of the plurality of broadcast signals received by the receiving unit, or the video content that corresponds to the video signal outputted by the external devices connected to the external device connecting section;
an external input selection section to select a first connecting unit, to which a first external device that outputs a first video signal relating to a first video content supplied at the program outputting unit is connected, among the plurality of the connecting units;
a non-broadcasting time zone detecting section to detect a non-broadcasting time zone in which the broadcast program is not broadcasted in any of the channels because there are no broadcast signals for the receiving unit to receive, according to the broadcast guide information included in the plurality of broadcast signals received by the receiving unit at a predetermined set time;
a switching time zone setting section to set a switching time zone to switch so as to enable supplying the video content that corresponds to the video signal outputted by the external devices at the program outputting unit;
a timing determination section to determine whether a timing in which power of the broadcast receiver was turned on falls within the non-broadcasting time zone detected by the non-broadcasting time zone detecting section or the switching time zone set by the switching time zone setting section; and
an input signal switching section to switch so as to enable supplying the video content that corresponds to the video signal outputted by the external devices at the program outputting unit, in response to a determination that the timing in which power of the broadcast receiver was turned on falls within the non-broadcasting time zone or the switching time zone, by the timing determination section,
wherein the non-broadcasting time zone detecting section stores data related to the detected non-broadcasting time zone in the memory, and wherein the timing determination section uses the data stored in the memory related to the detected non-broadcasting time zone to determine whether the timing in which power of the broadcast receiver was turned on falls within the detected non-broadcasting time zone.

2. A broadcast receiver comprising:
a memory;
a receiving unit to receive a plurality of broadcast signals that includes broadcast guide information relating to a predetermined broadcast program through an antenna;
an external device connecting section, to which an external device that outputs a video signal relating to a predetermined video content is connected;
a program outputting unit to supply a broadcast program that corresponds to one of the plurality of broadcast signals received by the receiving unit, or the video content that corresponds to the video signal outputted by the external device connected to the external device connecting section;
a non-broadcasting time zone detecting section that detects a non-broadcasting time zone in which the broadcast program is not broadcasted in any of channels because there are no broadcast signals for the receiving unit to receive, according to the broadcast guide information included in the broadcast signal received by the receiving unit at a predetermined set time;
a timing determination section to determine whether a timing in which power of the broadcast receiver was turned on falls within the non-broadcasting time zone detected by the non-broadcasting time zone detecting section; and an input signal switching section to switch so as to enable supplying of the video content that corresponds to the video signal outputted by the external device at the program outputting unit, in response to a determination that the timing in which power of the broadcast receiver was turned on falls within the non-broadcasting time zone, by the timing determination section, wherein the non-broadcasting time zone detecting section stores data related to the detected non-broadcasting time zone in the memory, and wherein the timing determination section uses the data stored in the memory related to the detected non-broadcasting time zone to determine whether the timing in which power of the broadcast receiver was turned on falls within the detected non-broadcasting time zone.

3. The broadcast receiver as claimed in claim 2, wherein:

the external device connecting section includes a plurality of connecting units to connect a plurality of external devices; and the broadcast receiver further comprises an external input selection section to select a first connecting unit to which a first external device that outputs a first video signal relating to a first video content supplied at the program outputting unit, among the plurality of the connecting units.

4. The broadcast receiver as claimed in claim 2, further comprising:

a switching time zone setting section to set a switching time zone to switch so as to enable supplying of the video content that corresponds to the video signal outputted by the external device at the program outputting unit; and a switching time zone determination section to determine whether a time in which power of the broadcast receiver was turned on falls within the switching time zone set by the switching time zone setting section;

wherein the input signal switching section switches so as to enable supplying of the video content that corresponds to the video signal outputted by the external device at the program outputting unit, in a case where it is determined that the time in which power of the broadcast receiver was turned on falls within the switching time zone, by the switching time zone determination section.

* * * * *